July 25, 1933. H. R. PALMER 1,919,377
GRASS TRIMMER
Filed Nov. 24, 1931 2 Sheets-Sheet 2
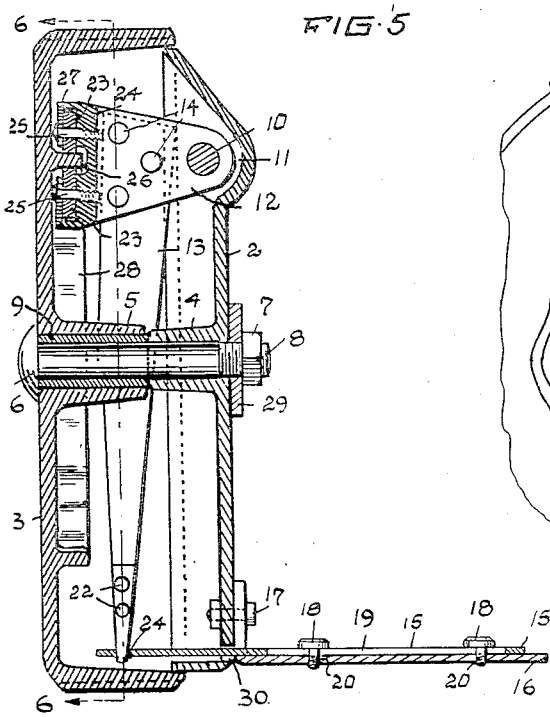
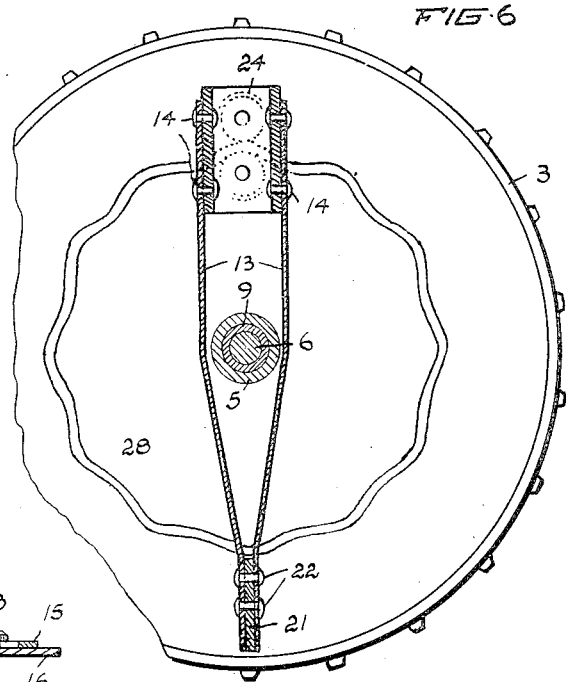
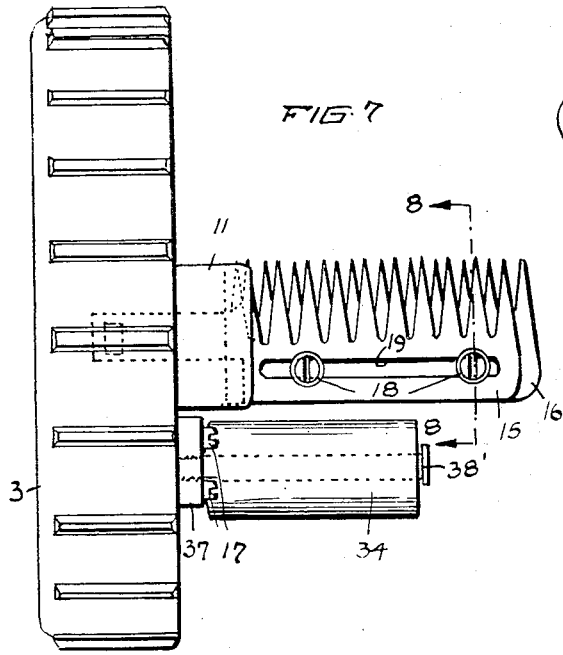
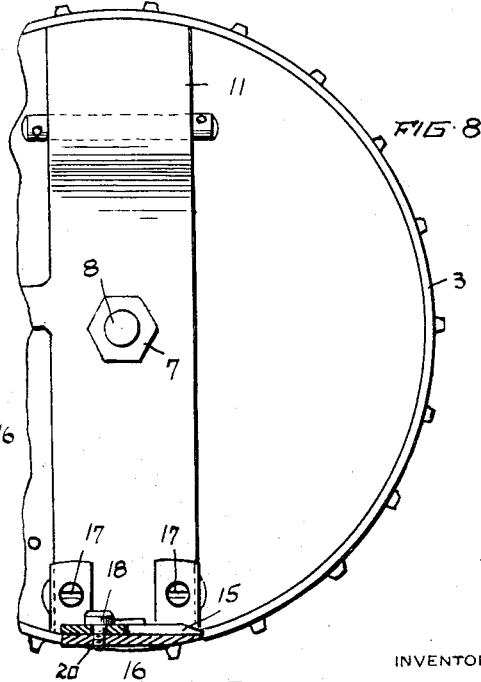
INVENTOR
HERBERT R. PALMER.
BY Fisher, Moser & Moore
ATTORNEY Patented July 25, 1933

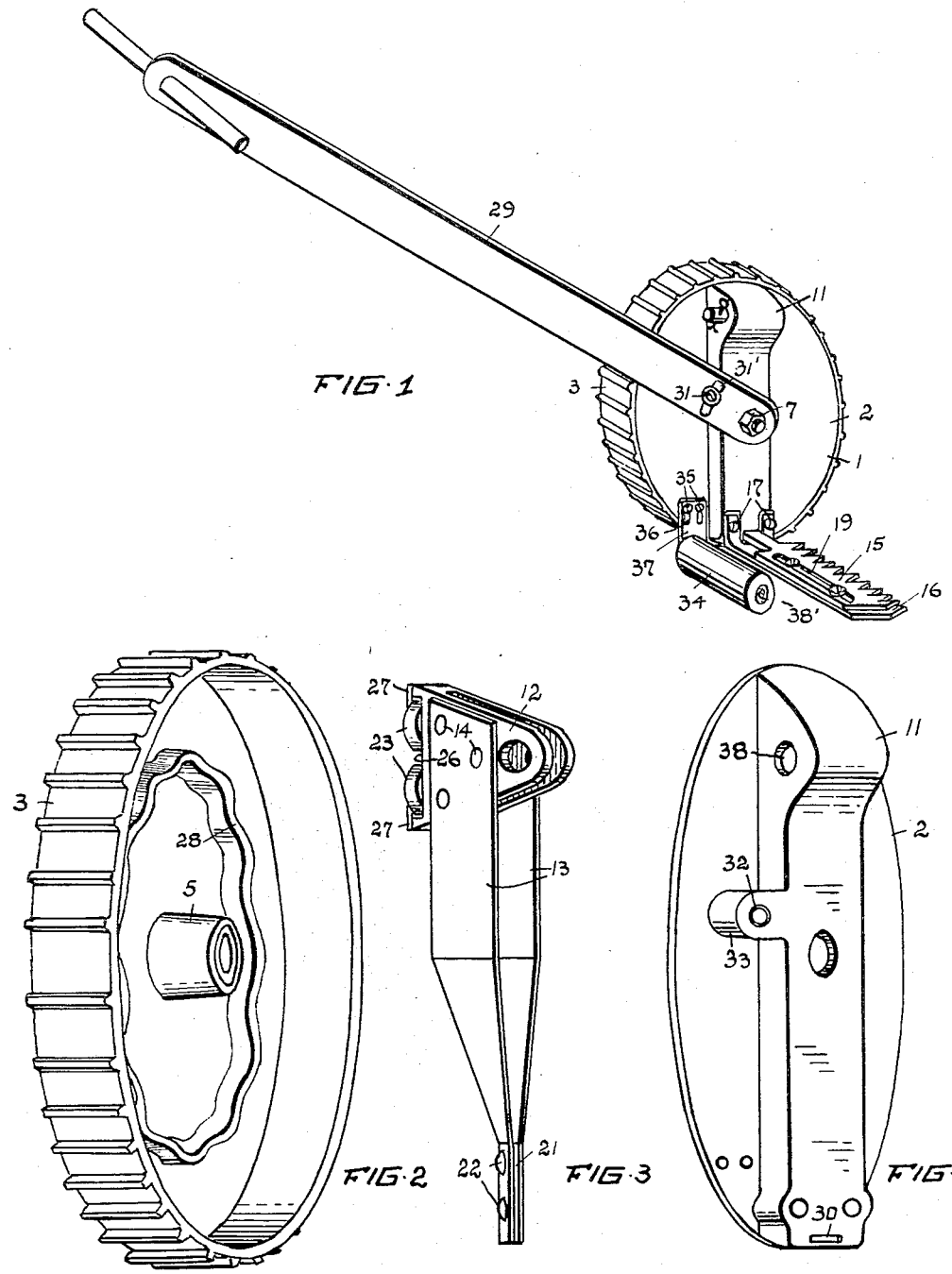

1,919,377

UNITED STATES PATENT OFFICE

HERBERT R. PALMER, OF SHAKER VILLAGE, OHIO

GRASS TRIMMER

Application filed November 24, 1931. Serial No. 577,113.

This invention relates to grass cutters and more particularly to that type of cutter adapted for trimming grass adjacent the marginal edges of lawns, around trees, near walks and other inaccessible places.

The principal object of the invention is to provide a grass cutter of durable and economical construction.

Another object of the invention is the elimination of gears and other complicated mechanism heretofore forming part of such devices.

A further object of the invention is the provision of efficient means for positively actuating the cutting knives.

Other and further objects and advantages will be apparent as the specification is considered in connection with the accompanying drawings, in which Fig. 1 is a perspective view of the improvement. Fig. 2 is an inside perspective view of the traction and driving wheel detached. Fig. 3 is a perspective view of the reciprocating lever for actuating the cutters. Fig. 4 is a perspective view of the base or body member of the grass cutter detached. Fig. 5 is a transverse section through the device. Fig. 6 is a section on line 6—6 of Fig. 5, Fig. 7 a plan view of the device showing the cutting knives in elevation and Fig. 8 is a section, partly in elevation, on line 8—8 of Fig. 7.

Referring more particularly to the drawings, 1 denotes a preferred form of grass trimmer constructed in accordance with my invention, comprising a body portion or plate 2 and a traction wheel 3 rotatably connected thereto. The plate 2 is formed with a centrally disposed inwardly projecting hub 4 and a chamber 11, and the wheel 3 is provided with a similar hub portion 5 aligned with and opposed to the hub 4. A headed axle bolt 6 passes through these hubs and secures the wheel and body part of the trimmer together when nut 7 is screwed home on the projecting threaded end 8 of the bolt. A metal or bushing member 9, mounted in the hub 5 takes the thrust of hub 4, thus permitting free rotary movement of the wheel 3 with respect to plate 2..

A pin 10 extending through openings 38 in the side walls of a chamber 11 formed on the body portion of plate 2, pivotally supports one end of a substantially U-shaped bracket 12 to the other end of which the upper extremity of a bifurcated lever 13 is rigidly secured by means of rivets 14 on other suitable fasteners. The lower extremity of this lever extends into an opening 24 in the inner reduced end of a reciprocable cutter blade 15, superposed upon a second fixed cutter blade 16, connected to the outer face of chamber 11, by bolts 17. Displacement of the movable cutter blade 15 is prevented by headed screws 18 which pass through elongated slot 19 in the blade 15 and threadedly engage openings 20 in the fixed blade 16. Lever 13 is preferably of bifurcated construction so as to conveniently straddle the hub members, and the lower end of the two halves of the lever are preferably secured together and to a spacing block 21, inserted therebetween, bolts 22 being employed for this purpose. When lever 13 is oscillated about the pin 10 as an axis, top cutter blade 15 is reciprocated through the slot 30 formed in the body or plate 2, as will be readily understood from an inspection of Fig. 5.

A pair of vertically spaced rollers 23 are rotatably secured to the web portion 24 of U-shaped bracket 12, by means of headed screws 25, the bracket being recessed, as at 26, to accommodate the rollers. The screws 25 also pass through and serve to hold a pair of spaced cover plates 27 in place. The traction wheel 3 is formed with an internal sinuous flange or cam 28, the top and bottom faces of which are engaged by the respective upper and lower rollers 23. Consequently, when traction wheel 3 is rotated cam flange 28 engages the rollers 23 thus rocking the bracket 12 and lever 13 about their pivot, and this oscillating movement of lever 13 causes cutter blade 15 to reciprocate in the manner previously described.

The device is manually propelled by means of a handle 29 mounted on the extended threaded end of headed axle bolt 6. Adjustment of the handle 29 to any desired inclination can be effected by means of a headed screw 31 which passes through a transverse slot 31' in the handle and screws into a threaded opening 32 in lug 33 formed on one side wall of chamber 11. A supporting roller 34 positioned directly to the rear of the cutter blades, is adjustably secured to the body or plate by headed screws 35, which pass through short slots 36 in a bracket 37 secured to the inner end of the roller axle 38', thus providing means for maintaining the cutters at the desired elevation with respect to the ground.

What I claim, is:

1. A grass trimmer, comprising a body part, a traction wheel rotatably connected with said body part, a continuous integral cam formed on the said wheel, a rocking lever, having two angularly related arms, one of which being pivotally supported on said body part, means on said lever and engaging with said cam for imparting oscillatory movement to said pivotally supported lever, and cutting means attached to said body and including a reciprocable means interconnected with and operable by the other arm of said lever.

2. A grass trimmer, comprising a body part, a traction wheel rotatably connected with said body part, a continuous integral cam formed on the said wheel, a rocking lever embodying angularly rotated arms of different length pivotally mounted with its shorter arm on said body part, means on said lever and engaging with said cam for imparting oscillatory movement to said lever, and cutting means attached to said body and including a reciprocable means interconnected with and operable by the larger arm of said lever.

3. A grass trimmer, comprising a body part, a traction wheel rotatably connected with said body part, a circuitous cam formed on one face of said wheel, a rocking lever pivotally mounted on said body part, a pair of spaced rollers connected to said lever and engaging opposite sides of said circuitous cam for imparting oscillatory movement to said lever, and cutting means attached to said body and including a reciprocable cutter blade or bar vertically slidably interconnected with and operable by said lever.

4. A grass trimmer, comprising a body part, a traction wheel rotatably connected with said body part, a flange on said wheel of sinuous shape, a bracket pivotally mounted on said body part, a bifurcated rocking lever fixed to and depending from said bracket, anti-friction means secured to said bracket and engaging opposite sides of said flange for imparting oscillatory movement to said lever, a stationary cutting blade fixed to said body part, a reciprocable cutting blade superimposed on said stationary blade, said last mentioned blade extending through a slot in said body part and interconnected with and operable by said lever.

HERBERT R. PALMER.